(12) United States Patent
Fritzsche

(10) Patent No.: US 12,059,711 B2
(45) Date of Patent: Aug. 13, 2024

(54) SYSTEM FOR SORTING ITEMS TO BE SORTED INTO TARGET POINTS, LOGICALLY LINKED TO THEIR DESTINATION, IN A MATRIX ARRANGEMENT

(71) Applicant: Körber Supply Chain Logistics GmbH, Constance (DE)

(72) Inventor: Roland Fritzsche, Nuremberg (DE)

(73) Assignee: KÖRBER SUPPLY CHAIN LOGISTICS GMBH, Constance (DE)

(*) Notice: Subject to any disclaimer, the term of this patent is extended or adjusted under 35 U.S.C. 154(b) by 103 days.

(21) Appl. No.: 17/791,100

(22) PCT Filed: Dec. 22, 2020

(86) PCT No.: PCT/EP2020/087637
§ 371 (c)(1),
(2) Date: Jul. 6, 2022

(87) PCT Pub. No.: WO2021/140031
PCT Pub. Date: Jul. 15, 2021

(65) Prior Publication Data
US 2023/0032013 A1    Feb. 2, 2023

(30) Foreign Application Priority Data
Jan. 9, 2020   (EP) .................................. 20150952

(51) Int. Cl.
*B07C 3/08* (2006.01)
*B65G 37/02* (2006.01)
*B65G 47/53* (2006.01)

(52) U.S. Cl.
CPC .............. *B07C 3/08* (2013.01); *B65G 37/02* (2013.01); *B65G 47/53* (2013.01)

(58) Field of Classification Search
CPC .......... B07C 3/08; B65G 47/53; B65G 47/46; B65G 37/02
See application file for complete search history.

(56) References Cited

U.S. PATENT DOCUMENTS 3,148,783 A * 9/1964 Michaels ................ B07C 3/082
198/370.05
5,078,257 A * 1/1992 Carter, Jr. .............. B65G 37/02
198/346.2

(Continued)

FOREIGN PATENT DOCUMENTS

CN    1165058 A    11/1997
CN    1946608 A    4/2007

(Continued)

*Primary Examiner* — Mark A Deuble
(74) *Attorney, Agent, or Firm* — Price Heneveld LLP

(57) ABSTRACT

Items are sorted into target points that are logically linked to their destination. The target points are arranged in a matrix array and in a first plane. One or more destinations can be logically assigned, at least temporarily, to the target points. First sorting conveyors run in a first direction and have discharge modules which can be actuated by a sorting controller. The conveyors are arranged in a second plane above the first plane and run between rows of target points. The discharge modules in the first sorting conveyors can serve target points on both sides of the sorting conveyors with sorting items intended for these target points. A pre-sorting conveyor with discharge modules is arranged laterally of the array of target points and is controlled to pass a sorting item to the sorting conveyor that serves the target point intended for this sorting item.

17 Claims, 5 Drawing Sheets

(56) References Cited

U.S. PATENT DOCUMENTS

| | | | | |
|---|---|---|---|---|
| 11,208,272 | B2* | 12/2021 | Battles | G06Q 50/28 |
| 11,390,463 | B1* | 7/2022 | Stone | B07C 5/36 |
| 11,524,845 | B2* | 12/2022 | Enenkel | B07C 5/36 |
| 11,618,483 | B2* | 4/2023 | Zhang | B23P 21/004 |
| | | | | 104/29 |
| 2004/0073333 | A1 | 4/2004 | Brill | |
| 2007/0075000 | A1 | 4/2007 | Martens et al. | |
| 2015/0001137 | A1 | 1/2015 | Layne et al. | |
| 2018/0154398 | A1* | 6/2018 | Layne | B65G 47/64 |
| 2022/0297160 | A1* | 9/2022 | Costanzo | B65G 47/53 |

FOREIGN PATENT DOCUMENTS

| | | |
|---|---|---|
| CN | 109047002 A | 12/2018 |
| CN | 208373592 U | 1/2019 |
| CN | 109928131 A | 6/2019 |

* cited by examiner

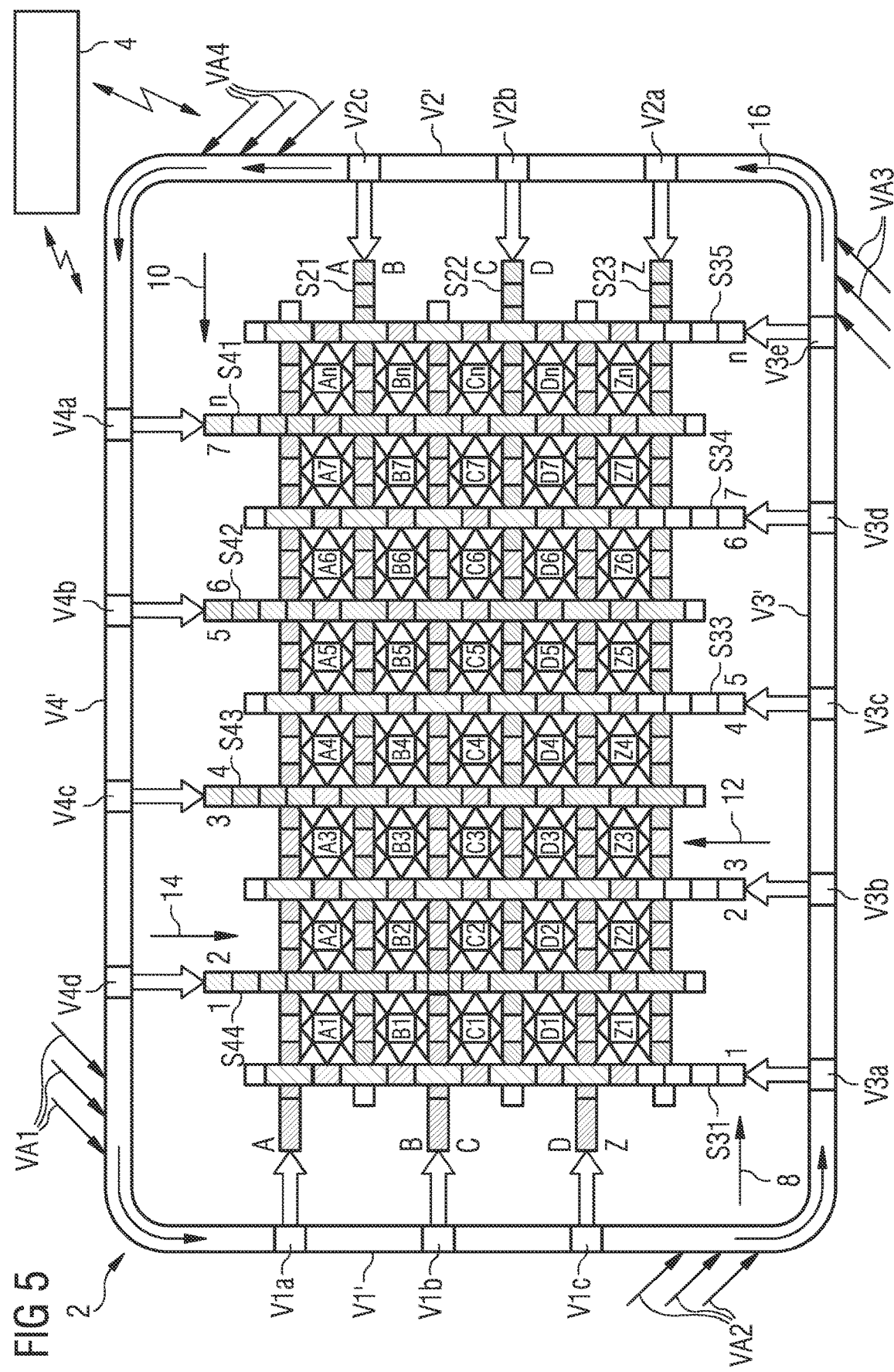

SYSTEM FOR SORTING ITEMS TO BE SORTED INTO TARGET POINTS, LOGICALLY LINKED TO THEIR DESTINATION, IN A MATRIX ARRANGEMENT

FIELD AND BACKGROUND OF THE INVENTION

The invention relates to a system for sorting items into destination points that are logically linked to their destination.

Large logistics centers with baggage, mail and/or package sorting installations, in which baggage items, letters and/or large letters and/or packages are processed, are operated for example by the company Siemens Logistics GmbH, Konstanz, Germany.

In these kinds of logistics centers, baggage items, letters, parcels, small packages, small items or all kinds of consignments (referred to as sorting items in the following) are transported from an inventory by a conveying system along a conveying path and are supplied, at multiple sorting outputs, for example realized by sorting diverters or crossbelt sorters or tilting apparatuses, to the respective destination points, such as destination points of a baggage sorting installation in an airport, for example. During the transport or sorting process, the sorting items are sorted into the destination points. For the sorting process, each destination point is in each case assigned a variable destination code according to the sorting logic or according to the sorting process by means of a sorting controller. The sorting items are also assigned a variable destination code, according to which they are then sorted into a destination point. Multiple destination points may also have the same destination code, for example in the case of destination addresses that are known to have high consignment volumes. This is useful, for example, if there is insufficient capacity at a destination point to receive all sorting items for this destination code.

With the heavy volumes of small item consignments, for which annual growth rates of more than 20% are predicted for the coming years, on the one hand the number of sorting items to be processed increases massively, while on the other hand the packaging of these small item consignments, which very often is not homogeneous, makes the sorting of these sorting items, which are generally referred to as positionally unstable, significantly more challenging compared to a conventional cuboidal package or parcel. For these small item consignments, which substantially originate from B2C e-commerce and have extremely heterogeneous and positionally unstable packaging, the future proportion of the overall cargo volumes is estimated to be more than 50%.

Furthermore, as part of the automation of the sorting processes, the aim is to fully automate the process according to the keyword "one touch" at as many terminal points as possible. At this point, in order to be able to avoid a throughput-reducing multi-stage or sequential sorting process, it is therefore necessary to be able to realize as many terminal points as possible in the smallest space. This requirement can in turn only be achieved by sorting systems which enable an arrangement of the terminal points and the conveying technology over multiple planes and therefore pass through space.

With the steadily increasing volumes of packages and parcels, many courier, express and package services, but also distributors, such as Amazon, are faced with the problem of being able to sort a wide variety of items in a rapid and economical manner. For this reason, there is a fundamental requirement for high-output sorting installations, which however are complex to control and require very high investment volumes. In addition, sorting installations of this kind also have comparatively long planning, installation and commissioning timeframes.

There are already a large number of sorting concepts on the market for solving the sorting tasks mentioned above; matrix sorting concepts are also known. To this end, destination points are arranged as a matrix, i.e. mostly in one plane and at a certain distance from one another. In this context, the discharging or sorting of the sorting items at the destination points may be performed by diverters, pushers, sorters or AGVs. Diverters and pushers, however, are mostly only able to sort on one side. Circular sorters with crossbelt or tilt tray technology require a lot of space due to large deflection radii and require high levels of investment. AGVs are likewise only suitable to a limited extent, as they either travel on fixed paths, wherein they are then unable to take advantage of their high flexibility, or they approach a wide range of destination points, wherein the sorting output may then again be significantly limited due to cross-traffic.

SUMMARY OF THE INVENTION

For this reason, the object underlying the present invention is to disclose a system for sorting items into destination points that are logically linked to their destination, which is characterized by a high sorting capacity with high sorting quality even for positionally unstable sorting items. In addition, a system of this kind should be able to be created in a cost-effective manner and simple to operate.

According to the invention, this object is achieved by a system for sorting items into destination points that are logically linked to their destination, comprising:
  a) a large number of destination points arranged in a matrix (array), wherein the destination points are additionally arranged such that they are situated substantially in a first plane, and wherein each of the destination points can be logically assigned one or more destinations, at least temporarily, by means of a sorting controller;
  b) a large number of first sorting conveyors running in a first direction with discharge modules that can be actuated by the sorting controller and which are arranged in a second plane situated above the first plane and run between rows of destination points such that the discharge modules arranged in the first sorting conveyors are capable of serving destination points, which are arranged on both sides of the first sorting conveyors, with sorting items intended for these destination points, and
  c) a first pre-sorting conveyor, which is arranged on one side of the array of destination points and in the second plane, with discharge modules that can be actuated by the sorting controller, wherein the first pre-sorting conveyor with the discharge modules thereof can be controlled such that a sorting item can be transferred to that sorting conveyor of the large number of first sorting conveyors which serves the destination point intended for this sorting item.

In this manner, a two-stage sorting can be carried out at destination points arranged as a matrix. In this context, the large number of first sorting conveyors may be designed in a simple manner as linear sorters which, for example, enable the use of simple belt conveyor modules on the conveying route and, in the region of the destination points, simple belt tilter modules (tiltable belt conveyor modules) for discharging the sorting items on both sides. It is therefore possible to achieve the particular advantage here that each of the destination points that can be reached by the sorting conveyors can be served by this pre-sorting conveyor.

In an advantageous embodiment of the present invention, a large number of second sorting conveyors may be provided, which run in a second direction running at an angle to the first direction, with discharge modules that can be actuated by the sorting controller, which are arranged and which are arranged in the second plane situated above the first plane and run between rows of destination points such that the discharge modules arranged in the second sorting conveyors are capable of serving destination points, which are arranged on both sides of the second sorting conveyors, with sorting items intended for these destination points, and a second pre-sorting conveyor is provided, which is arranged on one side of the matrix of destination points and in the second plane, with discharge modules that can be actuated by the sorting controller, wherein the second pre-sorting conveyor, which is arranged on the opposite side of the matrix of destination points, with the discharge modules thereof can be controlled such that a sorting item can be transferred to that sorting conveyor of the large number of second sorting conveyors which serves the destination point intended for this sorting item. This creates a system which makes it possible to be able to reach each destination point with one of the first sorting conveyors and with one of the second sorting conveyors. This makes it possible for the sorting output of the system to be as much as doubled, without a further additional upgrade having to be carried out for the individual components of the system with regard to the running speed or similar parameters.

This variant can be realized in a manner which is especially space-saving and less intensive with regard to components, if the second direction runs counter to the first direction and the first and second sorting conveyors are arranged such that they span the matrix of destination points running in alternating directions. This embodiment variant thus especially covers the case of a rectangular or hexagonal matrix of destination points. In the first-mentioned case, the matrix of destination points may have a rectangular pattern with M columns and N rows, in which the destination points have up to four nearest adjacent destination points. In the second-mentioned case, the matrix of destination points may have a hexagonal pattern, in which the destination points have up to six nearest adjacent destination points. In principle, however, the matrix of destination points may also have an irregular pattern, in which destination points with different sizes may also be arranged, for example. Furthermore, it is also possible for escape routes or generally larger travel routes to pass through the matrix of destination points, or the latter may also have an embodiment of at least some of the destination points as buffer destination points (similar to contemporary distribution centers with crossbelt sorters). The sole meaningful characteristic that can be given to the matrix in the context of the present invention in this regard could be the presence of a certain spatial arrangement of destination points or of supply chutes opening at the destination points, such that the sorting conveyors in the ideal scenario are able to serve as large a number of destination points arranged on both sides of the sorting conveyor as possible along their conveying path.

In principle, however, it is also possible for all sorting conveyors to run in the same direction and thus for the sorting items to only be led over the pre-sorting conveyor(s) on one side of the matrix. Thus, with the sorting conveyors, in the case of correspondingly embodied pre-sorting conveyors, there are two possibilities for reaching each destination point.

In a further advantageous embodiment of the invention, a large number of third sorting conveyors may be provided running in a third direction with discharge modules that can be actuated by the sorting controller and which are arranged in a third plane situated above the second plane and run between rows of destination points such that the discharge modules arranged in the third sorting conveyors are capable of serving destination points, which are arranged on both sides of the third sorting conveyors, with sorting items intended for these destination points, and c) a third pre-sorting conveyor may be provided, which is arranged on one side of the matrix of destination points and in the third plane, with discharge modules that can be actuated by the sorting controller, wherein the third pre-sorting conveyor with the discharge modules thereof can be controlled such that a sorting item can be transferred to that sorting conveyor of the large number of third sorting conveyors which serves the destination point intended for this sorting item.

In addition to this, a large number of fourth sorting conveyors may be provided, which run in a fourth direction running at an angle to the third direction, with discharge modules that can be actuated by the sorting controller and which are arranged in the third plane situated above the second plane and run between rows of destination points such that the discharge modules arranged in the fourth sorting conveyors are capable of serving destination points, which are arranged on both sides of the fourth sorting conveyors, with sorting items intended for these destination points, and a fourth pre-sorting conveyor may be provided, which is arranged on one side of the matrix of destination points and in the third plane, with discharge modules that can be actuated by the sorting controller, wherein the fourth pre-sorting conveyor, which is arranged on the opposite side of the matrix of destination points, with the discharge modules thereof can be controlled such that a sorting item can be transferred to that sorting conveyor of the large number of fourth sorting conveyors which serves the destination point intended for this sorting item.

Of course, it is also now possible to realize a further plane or even yet more further planes with an arrangement of sorting conveyors and pre-sorting conveyors of this kind. In principle, in this context, it may also be provided—explained in the example of the second and third plane—that the first and the third direction are matching (and likewise the second and fourth direction are matching). Only the arrangement of the corresponding pre-sorting conveyors would have to be adapted accordingly for this purpose. It would also be possible, however, for the first and the second direction and the third and the fourth direction to be the same, in pairs, in each case.

In an advantageous development, it may further be provided here that the fourth direction runs counter to the third direction and the third and fourth sorting conveyors are arranged such that they span the matrix of destination points running in alternating directions. Thus, here too, each destination point can be reached by one of the third sorting conveyors and by one of the fourth sorting conveyors. In this context, the third and the fourth direction can run at an angle, preferably substantially perpendicularly or at an angle of 60°, to the first and second direction.

In this manner, in the third plane, it is now possible to be able to provide a sorting concept analogous to the second plane, with which each destination point can now be reached by three or four different sorting conveyors, which in each case possess a separate pre-sorting conveyor in groups, which is accompanied by a further increase in the sorting output and thus very high overall sorting outputs can be achieved.

A further advantageous embodiment of the invention can be realized if at least one of the four pre-sorting conveyors mentioned above is embodied as a ring sorter surrounding the matrix of destination points. Thus, a sorting item can be transferred to at least one of the group of sorting conveyors. In one expedient embodiment, however, it is provided that all pre-sorting conveyors are incorporated together in a ring sorter surrounding the matrix of destination points, wherein the ring sorter is divided into a logical number of sorting sections, which corresponds to the number of groups of sorting conveyors, wherein each sorting section is assigned to a group of sorting conveyors and a feed point for feeding sorting items to the ring sorter is provided before each sorting section—viewed in the conveying direction of the sorting items.

This embodiment makes it possible that a sorting item situated on the ring sorter can thus be fed at one of the points, corresponding to the number of available groups of sorting conveyors, to the sorting conveyor intended for the destination point. In a ring sorter with four groups of sorting conveyors with a rectangular matrix of the destination points, for each circulation of the ring sorter four possibilities are thus produced for transferring the sorting item to a sorting conveyor serving the destination point intended for this sorting item. This achieves the advantage that in principle no pre-sorting is required and the sorting items can be output to an available sorting conveyor at a large number of possible points. Thus, in the rectangular arrangement of four pre-sorting routes in a ring sorter described by way of example, a sorting item can be conveyed further by 90 degrees up to the next pre-sorting route if the sorting conveyor in question in the preceding section was not available. As already described above, four opportunities are therefore produced during a complete circulation of the ring conveyor for being able to reach a certain destination point with one of the possible sorting conveyors for said destination point.

BRIEF DESCRIPTION OF THE FIGURES

Advantageous embodiments of the present invention are explained in detail below with reference to the drawing, in which:

FIG. 5 shows a schematic view of the sorting system in accordance with FIG. 4 with a ring sorter embodied as a pre-sorting conveyor logically divided in four.

DETAILED DESCRIPTION OF THE INVENTION

Figure 1:
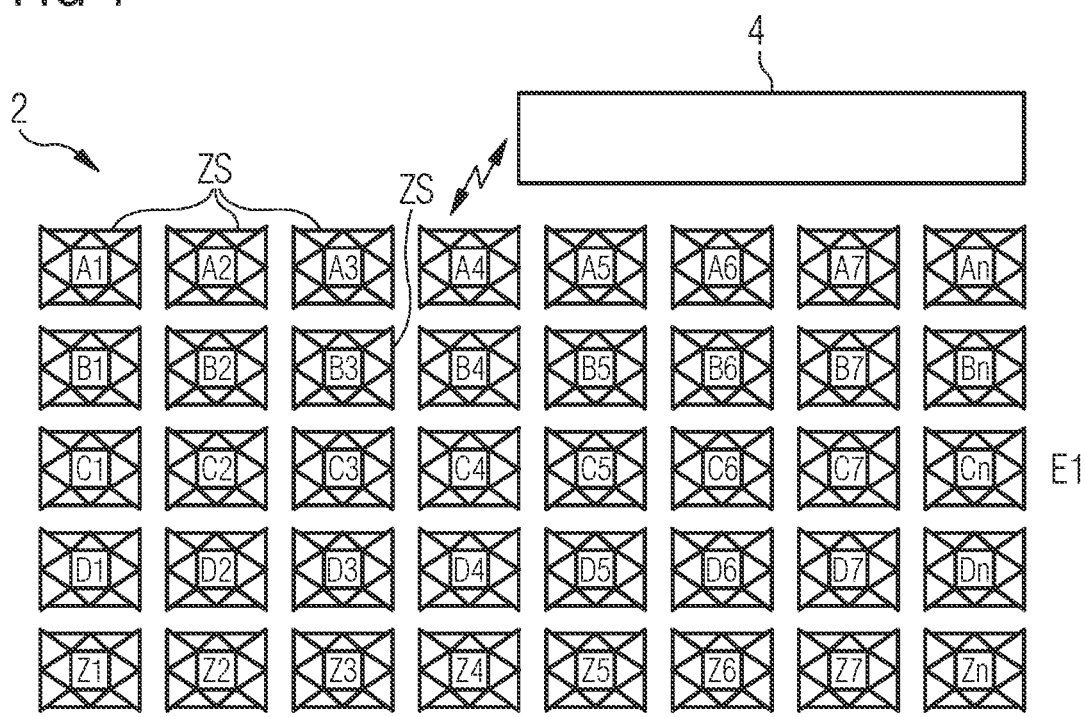
FIG. 1 shows a schematic view of a sorting system under construction with destination points arranged as a rectangular matrix.

FIG. 1 shows a schematic top view of a sorting system 2 for postal sorting items 6, such as parcels, packages, letters and the like, to be further constructed with FIGS. 2 to 6. A number of destination points A1 to An, B1 to Bn, C1 to Cn, D1 to Dn and Z1 to Zn, referred to as ZS for short if a very specific destination point is not intended, are in a first plane E1 in a rectangular matrix. Here, the destination points ZS are embodied as four-sided chutes, which open into a trolley standing below the chutes. A sorting controller 4 assigns each of these destination points ZS, for each sorting procedure, a logical destination—for example a specific address or also only a logical interim destination, for example a certain truck or a certain flight for further transport, for later sorting in a subsequent sorting step.

In the shown exemplary embodiment for the matrix, a regular arrangement of the destination points ZS is provided. Of course, destination points with different sizes or even larger distances between individual destination points, for example for escape routes or the like, can also be realized.

Figure 2:
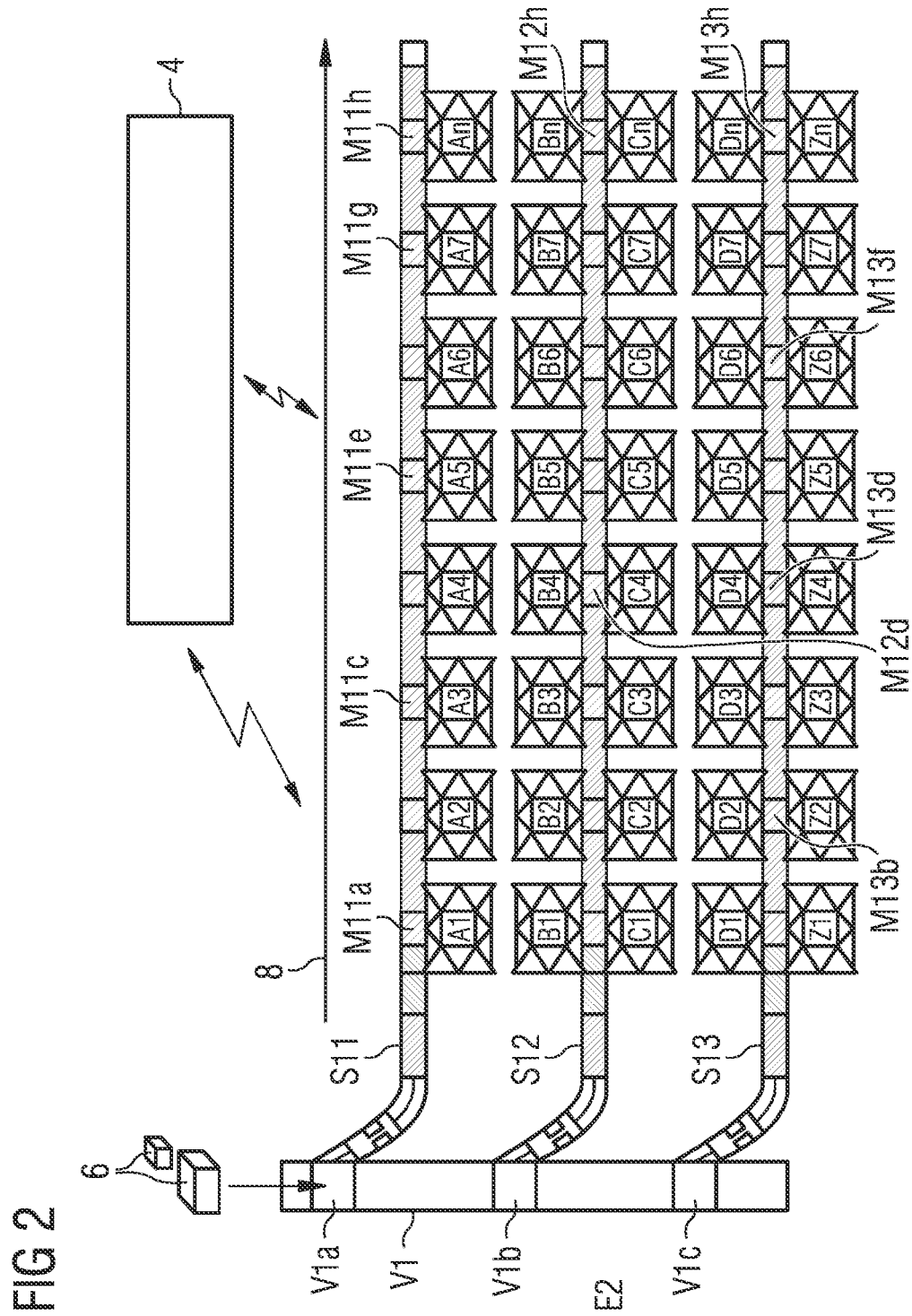
FIG. 2 shows a schematic view of the sorting system in accordance with FIG. 1 with a number of three first sorting conveyors and a first upstream pre-sorting conveyor.

FIG. 2 now already shows, in a schematic view, the sorting system 2 according to the development state in accordance with FIG. 1, additionally with a number of three first sorting conveyors S11, S12 and S13 and a first pre-sorting conveyor V1 upstream of these three first sorting conveyors S11, S12, S13. The three first sorting conveyors S11, S12, S13 each have a number of 8 discharge modules M11a to M11h, M12a to M12h, M13a to M13h—also simply referred to as the letter M for short—which can be actuated wirelessly by the sorting controller 4. In this context, the discharge modules M are embodied as belt tilt modules. Situated between the discharge modules M are belt conveyor modules (not referred to further here).

The three first sorting conveyors S11, S12, S13, in the present case, are here arranged in a second plane E2 above the first plane E1 and in this context run between rows of destination points ZS such that the discharge modules M12a to M12h, M13a to M13h arranged in the first sorting conveyors S12, S13 are capable of serving destination points ZS, which are arranged on both sides of the first sorting conveyors S12, S13, with sorting items 6 intended for these destination points ZS and conveyed in a first conveying direction 8. Thus, for example, a sorting item 6 can be emptied by the discharge module M12d into the destination point B4 or into the destination point C4.

In the representation in the drawing, situated on the left-hand side of the matrix of destination points ZS is a first pre-sorting conveyor V1, which is likewise arranged in the second plane E2, with discharge modules V1a, V1b, V1c that can be actuated by the sorting controller 4, wherein this first pre-sorting conveyor V1 with the discharge modules V1a to V1c thereof can be wirelessly actuated such that a sorting item can be transferred to that sorting conveyor of the large number of first sorting conveyors which serves the destination point intended for this sorting item. Returning to the example mentioned above with the discharge module M12d, there is a requirement here for the discharge module V1b to be actuated, so that the sorting item 6 can also actually be conveyed to the discharge module M12d.

The pre-sorting conveyor V1 usually has a considerably higher sorting output than the sorting conveyors S11, S12 and S13, for example. Unlike what was chosen in the representation in the drawings, the discharge modules V1a to V1c may also be arranged as continuously and dynamically drivable discharge elements along the entire path of the pre-sorting conveyor V1. Typically, a pre-sorting conveyor of this kind may then be embodied as a linear shoe sorter (sliding shoe sorter). Its output often also amounts to up to 10 times the output of one of the sorting conveyors serving the destination points. It should at least be noted, however, that the pre-sorting conveyor could also be embodied as a bag sorter or as a bomb bay sorter.

For the sake of clarity, the sensors and other controller elements, which are necessary for the sorting controller 4 to be able to also actually convey a sorting item 6 into the designated destination point by means of the actuation of the correct discharge modules, were not also drawn here. The arrangement of sensors and controller elements of this kind as well as the control of the sorting process for the proper destination point, however, may also be considered to belong to the prior art in this context.

Figure 3:
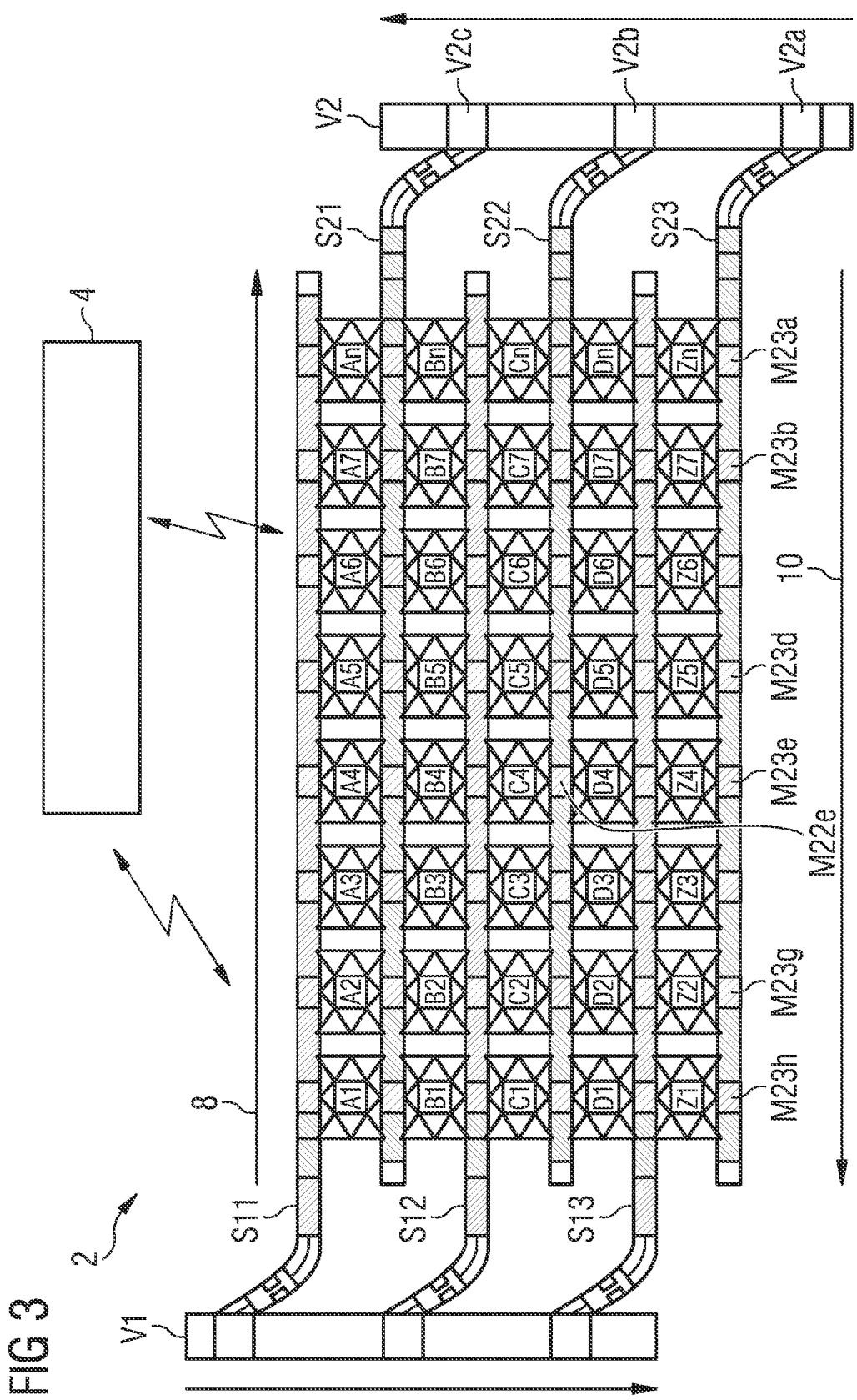
FIG. 3 shows a schematic view of the sorting system in accordance with FIG. 2 with a number of three second sorting conveyors and a second upstream pre-sorting conveyor.

FIG. 3 now already shows, in a schematic view, the sorting system 2 according to the development state in accordance with FIG. 2, additionally with a number of three second sorting conveyors S21, S22 and S23 and a first pre-sorting conveyor V2 upstream of these three second sorting conveyors S21, S22, S23. These three second sorting conveyors S21, S22, S23 also each have a number of 8 discharge modules M21a to M21h, M22a to M22h, M23a to M23h—also simply referred to as the letter M for short—which can be actuated (also wirelessly) by the sorting controller 4. In this context, the discharge modules M are embodied as belt tilter modules. Situated between the discharge modules M are belt conveyor modules (not referred to further here).

The three second sorting conveyors S21, S22, S23, in the present case, are here likewise arranged in the second plane E2 above the first plane E1 and in this context run between rows of destination points ZS such that the discharge modules M21a to M21h, M22a to M22h arranged in the second sorting conveyors S21, S22 are capable of serving destination points ZS, which are arranged on both sides of the second sorting conveyors S21, S22, with sorting items 6 intended for these destination points ZS and conveyed in a second conveying direction 10 (counter to the first conveying direction 8). Thus, for example, a sorting item 6 can be emptied by the discharge module M22e into the destination point C4 or into the destination point D4. What is now specific to this arrangement is that each destination point can now be served twofold, by one of the first sorting conveyors and by one of the second sorting conveyors, alternating from different directions in each case.

In the representation in the drawing, situated on the right-hand side of the matrix of destination points ZS is a second pre-sorting conveyor V2, which is likewise arranged in the second plane E2, with discharge modules V2a, V2b, V2c that can be actuated by the sorting controller 4, wherein this second pre-sorting conveyor V2 with the discharge modules V2a to V2c thereof can be wirelessly actuated such that a sorting item can be transferred to that sorting conveyor of the large number of second sorting conveyors which serves the destination point intended for this sorting item. Returning to the example mentioned above with the discharge module M22e, there is a requirement here for the discharge module V2b to be actuated, so that the sorting item 6 can also actually be conveyed to the discharge module M22e.

If a sorting item is now determined for the destination point C6, for example, then on one side, for this sorting item 6, the sorting controller actuates the discharge module V1b and the discharge module M12f for dropping to the left and on the other side actuates the discharge module V2b and the discharge module M22c for dropping to the right. Thus, the sorting capacity can be doubled through the addition of the second sorting conveyor S21, S22, S23 and the second pre-sorting conveyor V2, without installation parts having to run more quickly or similar acceleration steps having to be provided. In this context, it should be noted that the sorting output is primarily determined by the capacity of the pre-sorting conveyors. The actual sorting conveyors only limit what is known as the burst rate (i.e. how many sorting items go in succession from the pre-sorting conveyor on the sorting route along a sorting conveyor).

Figure 4:
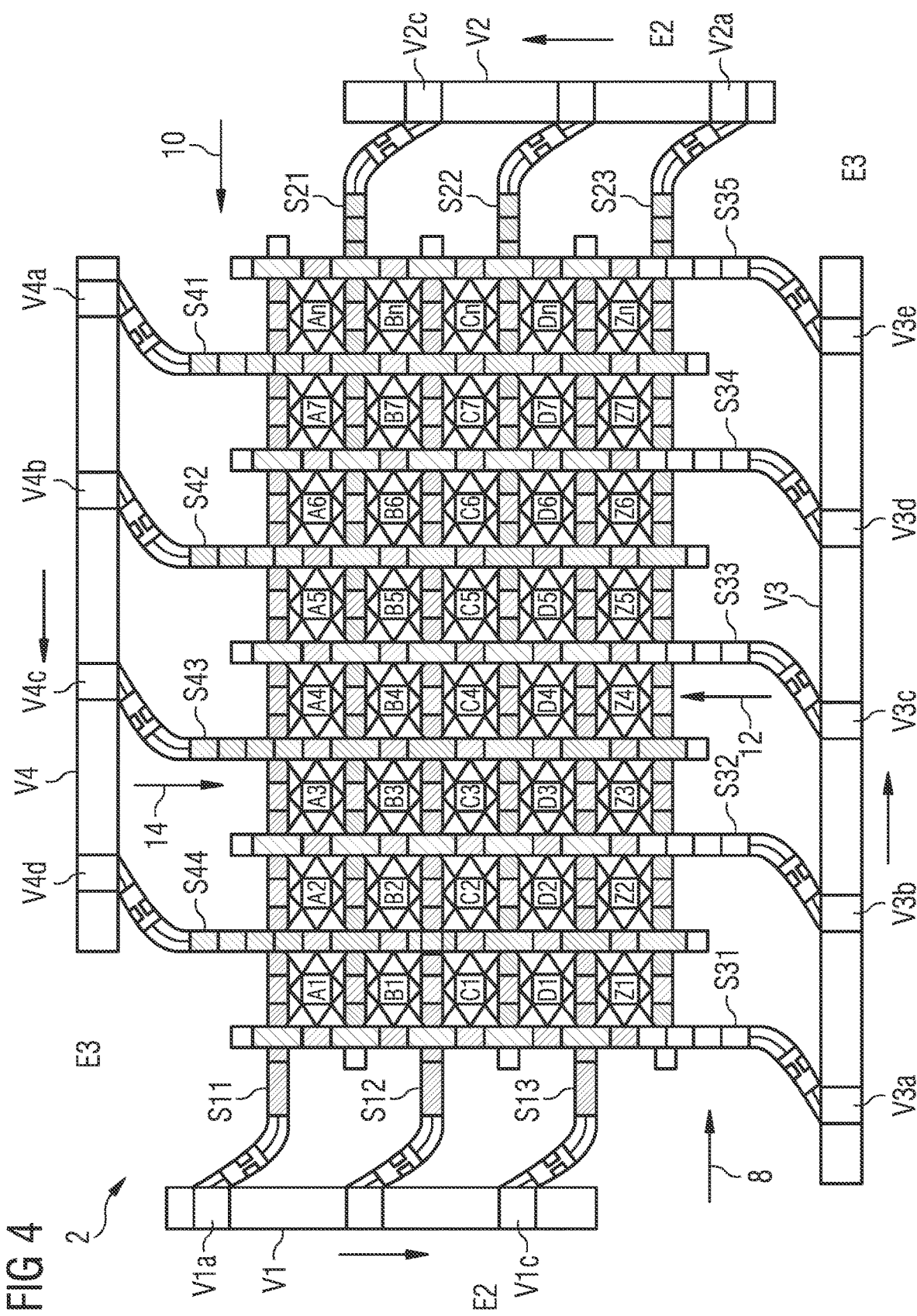
FIG. 4 shows a schematic view of the sorting system in accordance with FIG. 3 with a number of five third sorting conveyors and four fourth sorting conveyors and a third and a fourth upstream pre-sorting conveyor.

At this point, it should also be mentioned once again that the labeling with reference characters in FIG. 3 and further FIGS. 4 and 5 has been reduced to the essential. Specifically, the numbering of the discharge modules of the first and second sorting conveyors follows logically in the view from left to right or from right to left in the respective conveying direction of the sorting conveyors. Otherwise, identical structural parts also always have the same reference characters in FIGS. 1 to 5.

In an almost self-explanatory manner, the development stage of the sorting system 2 is now represented in FIG. 4, building upon the development stage in accordance with FIG. 3. A group of five third sorting conveyors S31 to S35 with upstream third pre-sorting conveyors V3 and a group of four fourth sorting conveyors S41 to S44 are now arranged in a third plane E3, which is situated over the plane E2. In this context, a conveying direction 12 of the third sorting conveyors S31 to S35 is counter to a conveying direction 14 of the fourth sorting conveyors S41 to S44. Both conveying directions 12 and 14 run at a right angle to the conveying directions 8 and 10 of the first sorting conveyors S11 to S13 or the two sorting conveyors S21 to S23.

It should be noted here that yet more groups of sorting conveyors may now also be provided in further planes. Thus, for example, the mapping of the sorting conveyors arranged in the second plane E2 and the third plane E3 may also be transferred to a fourth plane and a fifth plane, respectively. Of course, depending on the design, it is also possible to arrange sorting conveyors with upstream pre-sorting conveyors in even more planes. Likewise, it would also be possible for the first and the second direction and the third and the fourth direction to be the same, also in pairs.

In the representation in the drawings, however, despite the plethora of components, it can easily be seen that in the development stage in accordance with FIG. 4, each destination point ZS can now be served fourfold. For example, this should be explained here one time for the destination point D6, wherein the following discharge modules are to be actuated accordingly:

a) pre-sorting conveyors V1, V1c, sorting conveyors S13, M13f to the left;
b) pre-sorting conveyors V3, V3d, sorting conveyors S34, M34b to the left;
c) pre-sorting conveyors V2, V2b, sorting conveyors S22, M22c to the left; and
d) pre-sorting conveyors V4, V4b, sorting conveyors S42, M42d to the left.

FIG. 5 now schematically shows the sorting system 2, wherein the arrangement of the destination points ZS and the arrangement of the sorting conveyors S11 to S44 corresponds to the arrangement in accordance with FIG. 4.

Compared to FIG. 4, a modified arrangement for the four pre-sorting conveyors V1 to V4 has now been chosen in FIG. 5. In this context, this was an embodiment with a ring sorter 16 embodied as a pre-sorting conveyor logically divided in four. Instead of the pre-sorting conveyors V1 to V4, four logically divided subsections V1' to V4' are therefore chosen for the pre-sorting here. Each of these logically divided subsections V1' to V4' is preceded by a feed apparatus VA1 to VA4, with which the sorting items 6 are able to be fed to the ring sorter 16. In this context, these feed apparatus VA1 to VA4 are able to be embodied as points of entry, so that the sorting items, for the purpose of their feeding to the ring sorter 16, already have a speed component in the direction of the conveying direction of the ring sorter 16 that is prevailing in each case. Thus, for each sorting item 6, there is the possibility of transferring said sorting item to one of the sorting conveyors S11 to S44 at four different points, on which it is then transported to the associated destination point, where it is then dropped into the destination point.

Thus, in the shown exemplary embodiment in accordance with FIG. 5 (as well as of course also in all remaining exemplary embodiments embodied in the context of the invention, in particular those with destination points arranged in a hexagonal matrix), a large number of advantages are produced, which cover the established needs and trends of the courier, express and package market, as here it is possible for sorting to take place in a rapid manner and with simple construction and with high configurable output in a one-stream, one-touch method. In particular, the embodiments in accordance with the present invention make it possible to process a wide range of sorting goods; the jamming of belts, strips or overly flat consignments can therefore be reliably prevented. This also makes it possible to avoid a pre-sorting into groups of sorting goods, such as flyers, small items, packages for example, also with positionally unstable packaging and the like.

Likewise, there is also no need to pre-sort into groups of destination points, because any possible destination point can be reached by each of the pre-sorting sections VA1 to VA4 (one stream). A sorting item 6 output to the ring sorter 16 one time therefore no longer has to be touched until sorting (one touch), unless there is perhaps a sorting or reading error and the sorting item has to be dropped into an overflow arranged at the end of a sorting conveyor in each case. In addition, the sorting output of this sorting system 2 can be configured in a highly flexible manner. By arranging further sorting conveyors in further planes, the number of sorting paths to a destination point can be increased further. In addition, the number of destination points can also be scaled within broad limits and the kind of destination points can also be adapted to the respective needs and/or the characteristics of the sorting items within broad limits.

Moreover, the matrix arrangement of the destination points enables a particularly compact construction of the sorting system, meaning that it can also be created in a standard industrial building. With regard to the development costs, the commissioning and the maintenance, the sorting system 2 explained above has a high number of identical parts, because the same modules are repeatedly used for the belt tilter, the belt conveyors and the pre-sorting conveyors. This also has a favorable effect on the engineering, as the recurring modules mean that the engineering outlay is substantially limited to the configuring of the sorting system.

The invention claimed is:

1. A system for sorting items into destination points that are logically linked to their destination, the system comprising:
   a multiplicity of destination points arranged in a matrix of destination points, the destination points being situated substantially in a first plane and each of the destination points being logically assignable one or more destinations, at least temporarily, by a sorting controller;
   a plurality of first sorting conveyors running in a first direction, with discharge modules that are configured for actuation by the sorting controller and that are arranged in a second plane disposed above the first plane, said first sorting conveyors running between rows of destination points to enable the discharge modules in the first sorting conveyors to serve those destination points that are arranged on both sides of the first sorting conveyors with sorting items intended for those destination points;
   a first pre-sorting conveyor arranged on one side of the matrix of destination points, with discharge modules that are configured for actuation by the sorting controller, said first pre-sorting conveyor with the discharge modules thereof being controllable to enable a given sorting item to be transferred to a respective first sorting conveyor of the plurality of first sorting conveyors which serves the destination point intended for the given sorting item;
   a plurality of second sorting conveyors running in a second direction, at an angle to the first direction, with discharge modules configured for actuation by the sorting controller, the discharge modules being arranged in the second plane above the first plane, and the second sorting conveyors running between rows of destination points to enable the discharge modules in the second sorting conveyors to serve those destination points that are arranged on both sides of the second sorting conveyors with sorting items intended for those destination points; and
   a second pre-sorting conveyor arranged on one side of the matrix of destination points, with discharge modules configured for actuation by the sorting controller, said second pre-sorting conveyor, which is arranged on an opposite side of the matrix of destination points, with the discharge modules thereof being controllable to enable a given sorting item to be transferred to that sorting conveyor of the plurality of second sorting conveyors which serves the destination point intended for the given sorting item.

2. The system according to claim 1, wherein the first pre-sorting conveyor is arranged in the second plane.

3. The system according to claim 1, wherein the second pre-sorting conveyor is arranged in the second plane above the first plane.

4. The system according to claim 1, wherein the second direction runs counter to the first direction and the first and second sorting conveyors are arranged to span the matrix of destination points running in alternating directions.

5. The system according to claim 1, wherein the destination points have up to six nearest adjacent destination points.

6. The system according to claim 1, further comprising:
   a plurality of third sorting conveyors running in a third direction with discharge modules configured for actuation by the sorting controller and arranged in a third plane situated above the second plane, the third sorting conveyors running between rows of destination points to enable the discharge modules in the third sorting conveyors to serve those destination points that are arranged on both sides of the third sorting conveyors with sorting items intended for those destination points; and a third pre-sorting conveyor arranged on one side of the matrix of destination points, with discharge modules configured for actuation by the sorting controller, said third pre-sorting conveyor with the discharge modules thereof being controllable to enable a given sorting item to be transferred to that sorting conveyor of the plurality of third sorting conveyors which serves the destination point intended for the given sorting item.

7. The system according to claim 6, wherein the third pre-sorting conveyor is arranged in the third plane above the second plane.

8. The system according to claim 6, further comprising:
a plurality of fourth sorting conveyors running in a fourth direction at an angle to the third direction, with discharge modules configured for actuation by the sorting controller and that are arranged in the third plane situated above the second plane, said fourth sorting conveyors running between rows of destination points to enable the discharge modules in the fourth sorting conveyors to serve those destination points, which are arranged on both sides of the fourth sorting conveyors, with sorting items intended for those destination points; and a fourth pre-sorting conveyor arranged on one side of the matrix of destination points, with discharge modules configured for actuation by the sorting controller, said fourth pre-sorting conveyor, which is arranged on an opposite side of the matrix of destination points, with the discharge modules is controllable to enable a given sorting item to be transferred to that sorting conveyor of the plurality of fourth sorting conveyors which serves the destination point intended for the given sorting item.

9. The system according to claim 8, wherein the fourth pre-sorting conveyor is arranged in the third plane above the second plane.

10. The system according to claim 8, wherein the fourth direction runs counter to the third direction and the third and fourth sorting conveyors are arranged to span the matrix of destination points running in alternating directions.

11. The system according to claim 8, wherein the third direction and the fourth direction run at an angle to the first and second directions.

12. The system according to claim 8, wherein the third and fourth directions run at an angle of approximately 60° to the first and second directions.

13. The system according to claim 8, wherein the third and fourth directions run substantially perpendicularly to the first and second directions.

14. The system according to claim 8, wherein at least one of the first, second, third, or fourth pre-sorting conveyors is a ring sorter surrounding the matrix of destination points.

15. The system according to claim 14, wherein all pre-sorting conveyors are incorporated together in a ring sorter surrounding the matrix of destination points, wherein the ring sorter is divided into a logical number of sorting sections that corresponds to a number of groups of sorting conveyors, wherein each sorting section is assigned to a group of sorting conveyors and a feed point for feeding sorting items to the ring sorter is provided before each sorting section, as viewed in the conveying direction of the sorting items.

16. A system for sorting items into destination points that are logically linked to their destination, the system comprising:
a multiplicity of destination points arranged in a matrix of destination points, the destination points being situated substantially in a first plane and each of the destination points being logically assignable one or more destinations at least temporarily, by a sorting controller;
a plurality of first sorting conveyors running in a first direction, with discharge modules that are configured for actuation by the sorting controller and that are arranged in a second plane disposed above the first plane, said first sorting conveyors running between rows of destination points to enable the discharge modules in the first sorting conveyors to serve those destination points that are arranged on both sides of the first sorting conveyors with sorting items intended for those destination points; and
a first pre-sorting conveyor arranged on one side of the matrix of destination points, with discharge modules that are configured for actuation by the sorting controller, said first pre-sorting conveyor with the discharge modules thereof being controllable to enable a given sorting item to be transferred to a respective first sorting conveyor of the plurality of first sorting conveyors which serves the destination point intended for the given sorting item;
wherein the matrix of destination points has a rectangular pattern with M columns and N rows, and the destination points have up to four nearest adjacent destination points.

17. A system for sorting items into destination points that are Ionically linked to their destination, the system comprising:
a multiplicity of destination points arranged in a matrix of destination points, the destination points being situated substantially in a first plane and each of the destination points being logically assignable one or more destinations, at least temporarily, by a sorting controller;
a plurality of first sorting conveyors running in a first direction with discharge modules that are configured for actuation by the sorting controller and that are arranged in a second plane disposed above the first lane said first sorting conveyors running between rows of destination points to enable the discharge modules in the first sorting conveyors to serve those destination points that are arranged on both sides of the first sorting conveyors with sorting items intended for those destination points; and
a first pre-sorting conveyor arranged on one side of the matrix of destination points, with discharge modules that are configured for actuation by the sorting controller, said first pre-sorting conveyor with the discharge modules thereof being controllable to enable a given sorting item to be transferred to a respective first sorting conveyor of the plurality of first sorting conveyors which serves the destination point intended for the given sorting item;
wherein the first pre-sorting conveyor is a ring sorter surrounding the matrix of destination points.

\* \* \* \* \*